Nov. 16, 1954   A. H. SEATON   2,694,264
BOOK
Filed Aug. 7, 1952
Fig. 1.
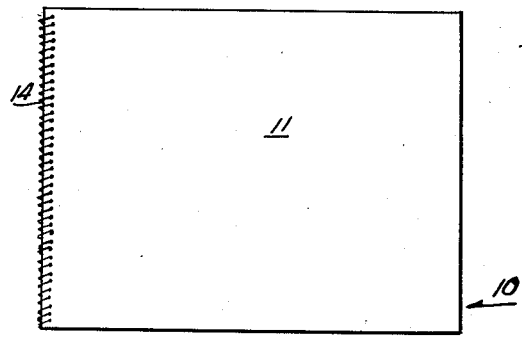
Fig. 2.
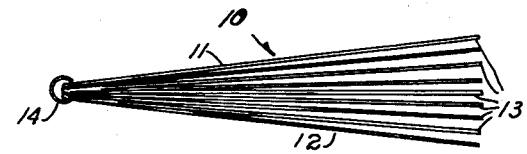
Fig. 3.
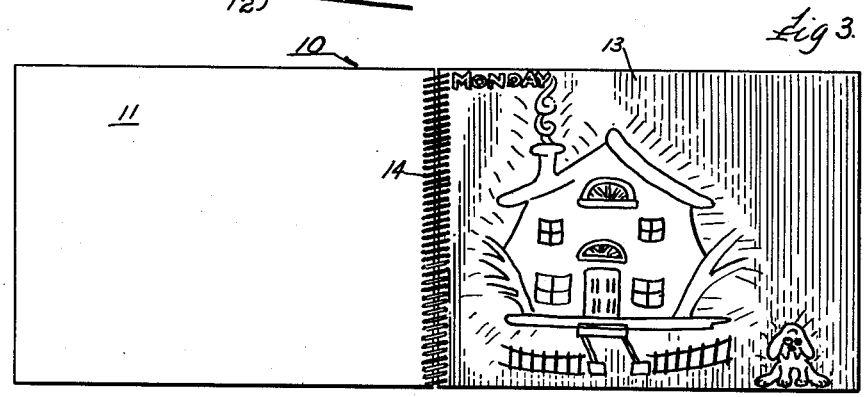
Fig. 5.
Fig. 4.
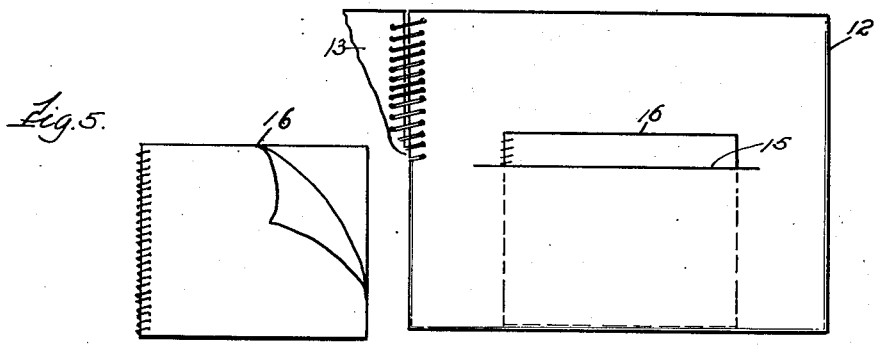
Inventor:
Ann H. Seaton
by McKnight and Comstock
Attorneys.

2,694,264

BOOK

Ann H. Seaton, New York, N. Y.

Application August 7, 1952, Serial No. 303,132

1 Claim. (Cl. 35—35)

My invention relates to a book which is provided with pages having illustrations formed of luminescent material which glows in the dark to form pictures after exposure to the light.

It is among the objects of my invention to provide such a book which is particularly adapted to be used by a parent and child for the education and/or amusement of the child. The child first looks at the pictures in the light while a story is being read and then, when the lights are turned out, the child looks at the pictures which glow in the dark.

It is another object of my invention to provide such a book which is provided with a separate text portion which is stored in a pocket of my book and which contains a story to be read to the child, accompanying the illustrations in my book.

My invention also comprises such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings, Fig. 1 is a front elevational view of my book; Fig. 2 is a top plan view of the same; Fig. 3 is a front elevational view of my book in open position, showing one of the pages; Fig. 4 is a front elevational view of the inside of the back cover of my book, showing the text in the pocket thereof and Fig. 5 is a front elevational view of the text.

A preferred embodiment of my invention comprises a book 10, having a front cover 11 and a back cover 12, between which are positioned a plurality of pages 13. The covers and pages are preferably formed of paper or the like and are bound together by a spiral binder 14, which extends along one edge thereof.

Back cover 12 is formed of a double thickness of paper, closed along the bottom edge, and has a slot 15 cut into the inner side. Slot 15 forms a pocket in back cover 12, on the inside thereof, in which a text 16 is held.

The pages 13 of my book 10 are provided with illustrations of animals, houses, people, etc., which illustrations are formed in whole or in part from luminescent materials or pigments. The pages of my text 16 are provided with reading matter which is designed to accompany the illustrations on pages 13.

In use, the text 16 is removed from its pocket in back cover 12, and my book 10 is given to the child, with the parent retaining the text 16. While the parent reads from text 16, the child listens and looks at the illustrations on pages 13. The child should be so positioned that a strong light falls directly on pages 13. In this way, the luminescent materials with which the pictures are formed become charged and store up light.

When the story in text 16 is finished, the parent turns out the light and the child is then fascinated by the multicolored glow of the luminescent materials, which provide their own light from that which they have stored up.

One form of my invention comprises a series of illustrations and accompanying text material which are divided into seven sections, so that a new and separate story may be read and seen each night of the week.

It is within the contemplation of my invention that pages 13 may be provided with illustrations or wording which are invisible in ordinary light, but become visible through luminescence when the light is turned out.

It is also contemplated that my invention may be used for advertising pamphlets or other material which is adapted for the education and/or entertainment of adults as well as children.

Having thus described my invention, I claim:

A book comprising a front cover, a back cover and a plurality of pages positioned therebetween, all formed of paper or the like and bound together at one edge thereof, one of the covers of said book having a double thickness of paper closed along the bottom edge with a slot cut in the inner side forming a pocket, a plurality of sheets having written text material thereon, said sheets positioned in said pocket and removable therefrom for reading to a child, each of said pages having pictures thereon illustrating the text material of said sheets, said pages treated with luminescent material, said pages adapted to be held in the light by the child while the text is being read to the child and to glow in the dark after exposure to the light for the edification and delight of the child.

References Cited in the file of this patent

UNITED STATES PATENTS

| Number | Name | Date |
|---|---|---|
| 267,284 | Trotter | Nov. 7, 1882 |
| 1,405,134 | Hoyme | Jan. 31, 1922 |
| 2,225,307 | Kruger | Dec. 17, 1940 |
| 2,523,724 | Satz | Sept. 26, 1950 |
| 2,538,085 | Cotton | Jan. 16, 1951 |